Jan. 24, 1961 S. W. MOULTON 2,969,426

COLOR TELEVISION RECEIVER WITH SIGNAL MODIFYING SYSTEM

Original Filed May 29, 1952 2 Sheets-Sheet 1

INVENTOR.

STEPHEN W. MOULTON

BY

Allen V. Hazeltine

ATTORNEY

INVENTOR.
STEPHEN W. MOULTON
BY Allen V. Hazeltine
ATTORNEY 2,969,426

COLOR TELEVISION RECEIVER WITH SIGNAL MODIFYING SYSTEM

Stephen W. Moulton, Wyncote, Pa., assignor to Philco Corporation, Philadelphia, Pa., a corporation of Pennsylvania Continuation of application Ser. No. 290,775, May 29, 1952. This application Oct. 9, 1959, Ser. No. 846,532

19 Claims. (Cl. 178—5.4)

The present invention relates to improvements in color television systems, the instant case being a continuation of my copending application Serial No. 290,775, filed May 29, 1952. More particularly it relates to improvements in certain portions of color television systems which result in increased fidelity of colored image reproduction.

Although not limited thereto, the invention is particularly useful in its application to so-called simultaneous color television systems and it will, therefore, be described with particular reference thereto.

Because of the intricate relationship between my inventive contribution and the conventional portions of such simultaneous systems it is believed to be in order to review briefly the characteristics of such systems, with emphasis on the conditions which give rise to the need for my improvement. Generally speaking, a simultaneous color television system is characterized by the production, transmission and reception of two simultaneously existing signals, one of which is repregence of the televised scene, while the other is representative of the color, or chromaticity intelligence of the same televised scene. In such a system, the transmitter is so arranged that the aforementioned signal representative of brightness—hereinafter called the "monochrome signal"—is produced with relatively great bandwidth and in the lowest frequency range, while the chromaticity signal is produced with relatively small bandwidth and in a frequency range just above the monochrome signal range.

In practice, this may be achieved by scanning the televised scene simultaneously and synchronously with three different cameras, equipped with different filters, respectively transmissive only of light of the red, green and blue primary colors. The output signals of these cameras will then have amplitudes which are respectively representative of the amounts of red, green and blue light in successively scanned portions of the televised scene. From these three camera output signals the monochrome signal may be derived by the additive combination of equal fractions of each of the individual camera output signals. The particular fractions of these signals which are so combined depend upon the system standards. According to one proposed standard the numerical value of each fraction is one-third. According to the same standard, the signal formed by this additive combination of one-third of each camera signal is limited to the 0 to 3 megacycle frequency range. This band-limited signal then constitutes the monochrome signal of the color television system and is ready for transmission to a distant receiver, subject only to superposition on an appropriate carrier wave signal.

The chromaticity signal of the system, on the other hand, is produced by first limiting the frequency range of each camera output signal to the 0 to 0.5 megacycle range and then using the different band-limited camera output signals so produced to modulate, respectively, the amplitudes of three different sinusoidal sub-carrier signals, of equal 3.5 megacycle frequency but differing from each other by 120 degrees in phase. By these modulating operations there are produced three separate signals nominally of 3.5 megacycle frequency, which differ from each other by 120 degrees in phase, and which are respectively amplitude modulated in accordance with the low frequency output components of different camera output signals. The three amplitude modulated signals thus produced are additively combined to produce a single sinusoidal signal, also of 3.5 megacycle nominal frequency, but whose amplitude and phase varies, depending upon the relative proportions of the 0 to 0.5 megacycle components of the different camera output signals. The signal resulting from this additive combination of the three separate amplitude modulated subcarrier signals constitutes the chromaticity signal of the system and is combined with the monochrome signal produced in the manner hereinbefore outlined and in the same relative frequency ranges in which they are initially produced to constitute the composite signal for transmission.

By reason of the manner in which this composite signal is produced, its amplitude is accurately representative of the amounts of red, green or blue light in the televised scene only at three extremely brief instants during each cycle of the chromaticity component. Recalling that this chromaticity component was produced by the additive combination of three separate signals of the same frequency, but of mutually different phases, respectively amplitude modulated in accordance with red, green and blue color intelligence, it will be apparent that the signal produced by this additive combination will be representative of red chromaticity intelligence only at the time when the two other component signals are both zero. Except in the case where the televised scene contains only red light, so that the output signals produced by the blue and green cameras are themselves zero, this condition will only occur at that one interval during each cycle of the red-signal-modulated sub-carrier at which the other two sub-carriers, differing therefrom by 120 degrees in phase, are both zero. At that particular interval during each cycle of the signal produced by additive combination of the said three separate subcarrier signals, the resultant signal will be due entirely to the influence of the red camera output, with no contribution from the green and blue camera signals. Similarly, there will be other intervals, during each cycle of the resultant signal, at which the entire signal will be respectively due to the blue and green camera signals. In the case under consideration, namely where the separate sub-carrier signals differ in phase by 120 degrees, these three separate intervals will occur at equally time-spaced intervals during each cycle of the chromaticity signal and in the same time sequence in which the separate sub-carrier signals pass through any predetermined phase condition. Since these separate sub-carrier signals are of continuously varying nature, it will be apparent that the intervals at which the resultant chromaticity signal is thus accurately representative of red, green or blue chromaticity intelligence information are of extremely brief, and indeed of almost infinitesimal duration. It follows that the composite signal, comprised of the unidirectional monochrome component and of the alternating chromaticity component, will have a total amplitude which is accurately representative of the amounts of light of the different colors, red, green and blue, only at these same brief intervals during each cycle of the chromaticity component. This fact is emphasized because of its important bearing on my invention.

Since my invention effects improvements in the performance of a color television receiver when supplied with a simultaneous signal of the general form hereinbefore described, a full comprehension of the invention also requires an understanding of basic receiver construction. A modern receiver for use with a simultaneous color television system differs from well-known black-and-white television receivers most conspicuously in the screen construction of its image display cathode ray tube. More particularly, the screen of the color cathode ray tube is constituted of an orderly array of closely spaced, minute phosphor elements, successive ones of these elements, counting in the direction of horizontal scan, being respectively responsive to electron beam impingement to emit red, green and blue light in cyclically repetitive sequence. This sequence is so chosen that the different elements are scanned by the beam in the same order in which the intervals occur at which the signal amplitude is representative of these colors in the televised scene. Furthermore, the speed of scan of the beam is preferably so chosen, relative to the frequency of occurrence of these color representative intervals and to the phosphor element spacing, that the beam is impingent upon successive elements emissive of light of any particular color at successive intervals at which the signal is representative of this color.

As has been explained, these intervals at which the amplitude of the signal is accurately representative of the amount of light of any one particular color are actually of very short duration. The colored light emissive elements successively impinged by the beam, however, must be of substantial width, measured in the direction of beam traversal, for otherwise the total light emission from the screen will be insufficient to produce a useful image. Consequently, during its scan across the tube structure, the beam will impinge upon each phosphor element during an interval of time which, while relatively short, is, nevertheless, much longer than the very brief interval during which the received signal is accurately representative of intelligence respecting any one particular color.

Because the monochrome component of the composite color television signal, produced in the manner hereinbefore outlined, has finite unidirectional amplitude whenever the televised scene is not entirely dark, the composite signal will have finite amplitude, not representative of intelligence respecting any of the different primary colors, during certain portions of these relatively long intervals during which the beam is impingent upon colored light emissive screen elements.

If this composite signal is directly utilized at the receiver to control the intensity of the scanning electron beam of the cathode ray tube, then light emission from the screen structure will also occur during the aforementioned portions of the light productive intervals when the signal is not representative of any colored light intelligence.

It has been found that the ratios between the amounts of light of different colors produced by the cathode ray tube during intervals of corresponding light emission are closer to unity, under the foregoing signal conditions, than the ratios between the signal amplitudes at their different color representative intervals. This finding is susceptible of ready experimental verification and is also graphically demonstrated hereinafter. The visual result of this approach to unity of the ratios between the reproduced amounts of light of different colors is the desaturation or "washing out" of the reproduced colors relative to the corresponding colors of the televised scene. With screen elements of practical dimensions, this desaturation is so pronounced as to have been deemed very objectionable by numerous observers.

Efforts to overcome this difficulty have involved the addition, to the received composite signal, of auxiliary signals at frequencies harmonically related to the frequency of the received chromaticity component. Depending upon the number of such added harmonics, the signal utilized to control the cathode ray tube beam intensity was transformed from its original form into a signal approximating more or less closely a series of spaced pulses occurring at times centered about the instants at which the originally received signal was accurately representative of intelligence respecting any one color.

This approach to the problem failed to provide a satisfactory solution, first because it required the incorporation into the receiver of expensive wideband circuits necessary to handle not only the received signal of relatively narrow bandwidth but also the several higher harmonics thereof and secondly, because this solution did not go to the root of the problem. For, to the extent that the produced pulses were of appreciable duration, they too produced phosphor excitation in response to undesired portions of the originally received signal. Finally, the added harmonics of the chromaticity component produced beat frequency signals with each other as well as with the received signal components, due to substantially unavoidable non-linearities in the electron gun of the cathode ray tube, and these beat signals, in turn, produced undesired beat patterns in the light emission from different portions of the cathode ray tube screen.

It is, accordingly, a primary object of the invention to provide means, in a color television system, for improving the fidelity of color reproduction of a televised scene.

It is another object of the invention to effect image reproduction improvements in a color television system wherein a televised scene is reproduced on a single cathode ray tube screen structure comprising closely spaced fluorescent elements, different ones of these elements being emissive of light of different primary colors.

It is still another object of the invention to improve the fidelity of reproduction of the color intelligence represented by a signal including a unidirectional component and a cyclically varying component and whose total amplitude is representative of intelligence respecting three different primary colors at three time-spaced instants during each cycle of the varying component.

It is a still further object of the invention to provide means for reducing the color desaturation which occurs when a televised scene, represented by a unidirectional monochrome signal and an alternating chromaticity signal, is reproduced by means of a cathode ray tube having a screen structure formed of spaced fluorescent elements emissive of light of different colors in cyclically recurrent order, where these fluorescent elements are necessarily of finite width.

A still further object of the invention resides in the provision of means for reducing the color desaturation which occurs, in the absence of my improvement, when it is attempted to reproduce the intelligence represented by a monochrome signal and a chromaticity signal by applying these two signals simultaneously to the beam intensity control grid electrode of a cathode ray tube having a screen structure comprising spaced fluorescent elements emissive of differently colored light in cyclically recurrent order, the provision of these means requiring no increase in the bandwidth of the circuits associated with this cathode ray tube.

I have discovered that any given change toward unity in the ratios between the amounts of light of different colors emitted by a color cathode ray tube, compared to the ratios between amounts of light of the same colors in the televised scene, can be prevented by appropriately decreasing the amplitude of the monochrome signal component compared to that of the chromaticity signal component prior to their joint application to the color cathode ray tube.

I have further discovered that this change in the ratios between the amounts of screen produced light of the different colors, compared to the ratios of the amounts of light of the same colors in the televised scene, becomes greater as the absolute amplitude of the chromaticity signal component increases.

In accordance with my invention, then, I provide means for reducing the amplitude of the monochrome signal component relative to the amplitude of the chromaticity signal component by an amount which is proportional to the amplitude of the chromaticity signal component, prior to application of these signal components to the image reproducing cathode ray tube. By this means I am able to insure reproduction of a televised scene with different colors in substantially their true relationship and with desaturation reduced to any desired extent.

The particular manner in which the apparatus necessary to practice my invention is constructed and the manner in which it functions according to the invention is explained hereinafter with reference to the accompanying drawings wherein.

Figure 1:
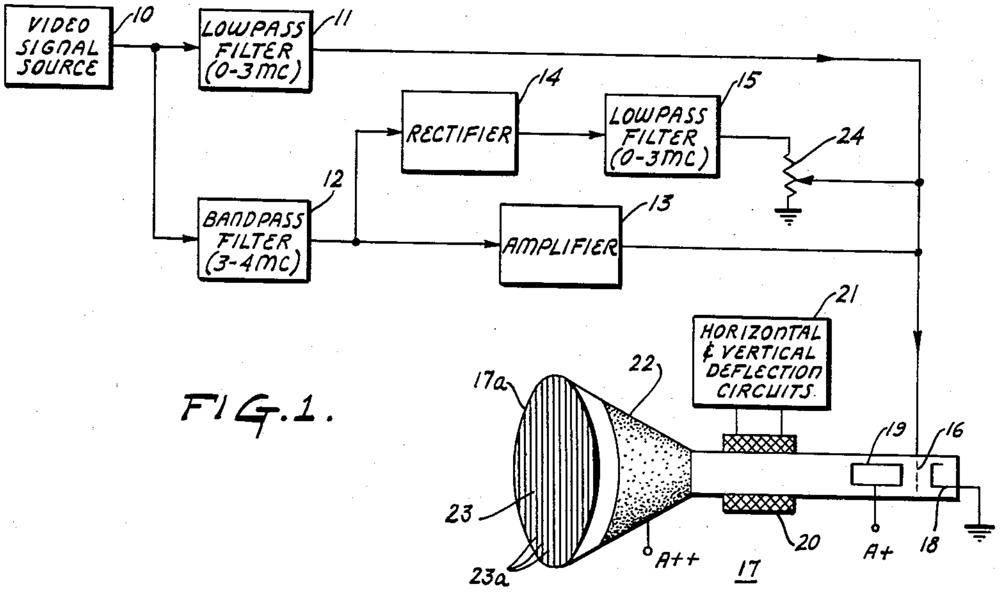
Figure 1 illustrates that portion of a color television receiver which embodies my invention, together with such conventional apparatus as is intimately associated therewith.

There is illustrated in Figure 1, to which more particular reference may now be had, a video signal source 10. This video signal source 10 may comprise all of the conventional circuits of a color television receiver which precede its video frequency stages. These may include an antenna circuit, a radio frequency amplifier, a frequency converter, an intermediate frequency amplifier and a video detector. Thus, there will be availale at the output of video signal source 10, the received composite television signal, reduced to its lowest, or video frequency range. As hereinbefore discussed, this signal may comprise a monochrome component occupying the 0 to 3 megacycle frequency range, a chromaticity component comprised of the sum of three sinusoidal signals of 3.5 megacycle nominal frequency, each amplitude modulated with a signal representing the intensity of a different primary color of the televised scene, such as red, green and blue, respectively, and conventional horizontal, vertical and color synchronizing signals interspersed with the video intelligence representative signal at the usual intervals. The output signal from source 10 is now simultaneously supplied to low-pass filter 11 and to bandpass filter 12. The output signal from bandpass filter 12 is supplied simultaneously to amplifier 13 and to rectifier 14, the output signal from rectifier 14 being in turn supplied to low-pass filter 15. The output circuits of low-pass filter 11, amplifier 13 and low-pass filter 15 are all connected to the beam intensity control grid 16 of a cathode ray tube 17. This tube may comprise a conventional cathode 18, a first anode 19 connected to a suitable source of first anode potential A+ and horizontal and vertical magnetic deflection coils 20 supplied with such signals from conventional horizontal and vertical deflection circuits 21 as are appropriate to cause the electron beam from cathode 18 to scan a conventional rectangular raster on the screen of the tube. The tube may further comprise a second anode 22 which may, as usual, take the form of a coating of conductive material on the inside of the funnel-shaped portion of tube 17, this coating being connected to a conventional source of anode potential A++. On the face plate 17*a* of the cathode ray tube 17, there is then deposited a screen structure 23. This screen structure differs most conspicuously from that of conventional cathode ray tubes used for black-and-white television in that it is not uniform but is, instead, constituted of a large number of narrow, parallel strips of phosphor materials, disposed with their longitudinal dimensions transverse to the horizontal beam scanning direction and constructed of such materials that different ones of these phosphor strips are responsive to electron beam impingement to emit light of different primary colors, for example, red, green and blue, respectively. Phosphor strips emissive of light of these different colors are usually disposed in regularly recurrent sequence across the screen surface; in one conventional arrangement, they occur in the order red, green, blue, following the direction of horizontal scan of the electron beam. This screen construction in the form of vertical strips is diagrammatically represented, in Figure 1, by a plurality of vertical lines 23*a* on face plate 17*a* of the cathode ray tube. As has been indicated, the composite video signal from source 10 is supplied to bandpass filter 12, which latter may be of any conventional construction provided it is so arranged as to be transmissive only of signal components in the 3 to 4 megacycle frequency range, to the substantial exclusion of all other frequency components. Consequently, there will appear, at the output of bandpass filter 12, only the chromaticity signal occupying the 3 to 4 megacycle frequency range, as well as such components of the various synchronizing signals as lie in the 3 to 4 megacycle frequency range. For reasons which will be explained hereinafter, the presence of these synchronizing signal components in the output signal from bandpass filter 12 is immaterial to the practicing of my invention.

The chromaticity signal transmitted by bandpass filter 12 is supplied to rectifier 14 which is arranged to produce a unidirectional output signal having an amplitude proportional to the amplitude of the sinusoidal chromaticity signal. This rectifier 14 may take any conventional form such as, for example, that of a simple diode which will produce half-wave rectification of the chromaticity representative sinusoidal signal in the well known manner. The unidirectional output signal from rectifier 14 is then supplied to low-pass filter 15, which is conventionally constructed and arranged to transmit only signals in the 0 to 3 megacycle frequency range. This low-pass filter 15 will therefore produce an output signal only in response to frequency components in the output signal from rectifier 14 which lie in the 0 to 3 megacycle frequency range. It will be recalled that this is the frequency range occupied by the monochrome signal. Consequently there is available, at the output of low-pass filter 15, a signal in the monochrome frequency range having a unidirectional amplitude proportional to the amplitude of the chromaticity signal. Usually the simple potentiometer 24 will suffice to adjust the ratio between the amplitude of this output signal from low-pass filter 15 and the amplitude of the received chromaticity signal, for it will not usually be necessary to have this ratio exceed unity. Should this become desirable, however, it is apparent that an appropriate D.-C. amplifier circuit may be connected in the output circuit of low-pass filter 15 in place of the potentiometer 24.

As has been indicated, the chromaticity signal separated by bandpass filter 12 is supplied to amplifier 13, as well as to rectifier 14. This amplifier may be of any conventional form suitable to produce a signal voltage gain whose magnitude is preferably variable over a range between one and three. The particular gain adjustment of this amplifier depends upon the adjustment of the particular ratio maintained between the output signal from filter 15 and the amplitude of the received chromaticity signal. The relationship between these two adjustments is explained in detail hereinafter.

In any event, the chromaticity signal transmitted by amplifier 13 is now recombined with the output signals from low-pass filters 11 and 15 and the combined signal so produced is supplied to beam intensity control grid 16 of tube 17.

Low-pass filter 11 may be of any conventional construction, its elements being so proportioned that it is transmissive only of signals in the 0–3 mc. frequency range to the substantial exclusion of signals of all other frequencies. As a result, there will appear, at the output of filter 11, the monochrome signal component with substantially the same amplitude with which it is supplied from video signal source 10. Furthermore, this monochrome signal component will always have a predetermined polarity with respect to its zero potential reference level. Rectifier 14 is then so arranged that its output signal, and also that of filter 15, has a polarity, with respect to the same zero reference potential, which is opposite to the polarity of the monochrome signal supplied from low-pass filter 11. Consequently, additive combination of the output signals from low-pass filter 11 and rectifier 14, respectively, will produce a combined signal having a 0 to 3 megacycle component which is proportional to the algebraic difference between the received monochrome signal component and a component in the monochrome frequency range proportional to the amplitude of the chromaticity component.

Figures 2A, 2B, 2C:
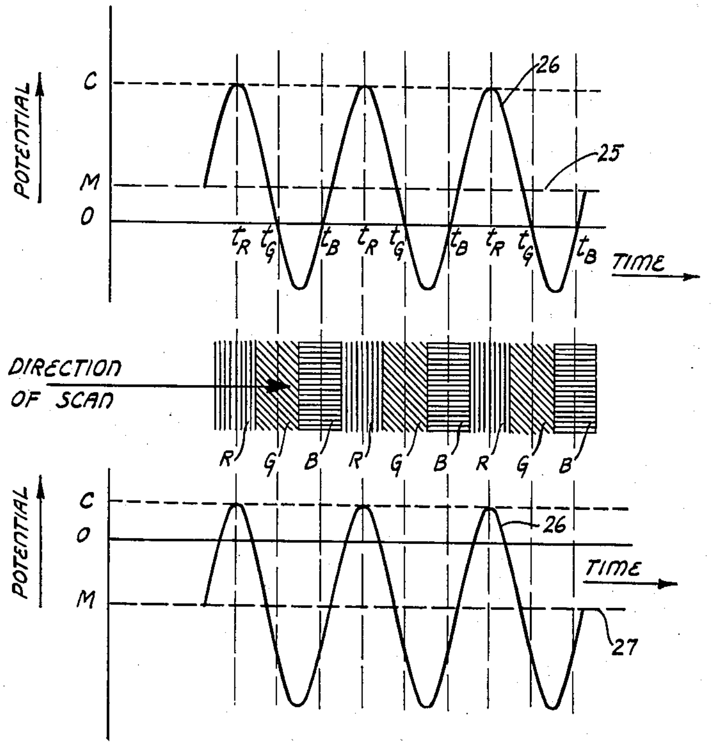
Figures 2A through 2C are diagrams which will be referred to in explaining the operation of the embodiment of Figure 1.

The effect of the aforedescribed modifications of the received video signal on the image reproduced by the cathode ray tube will be better appreciated upon consideration of the explanatory diagrams presented in Figures 2A through 2C, to which more particular reference may now be had. Figure 2A is a graphical representation of a typical received video signal. It comprises a plot of video signal potential versus time, the passage of time being measured toward the right along the abscissa axis, while increasing potentials are measured upward along the ordinate axis.

The monochrome signal level is represented by broken horizontal line 25, while the chromaticity signal is represented by the sinusoidal curve 26. The amplitude of the monchrome signal is then indicated by the distance OM, while the amplitude of the chromaticity signal is indicated by the distance MC, both measured along the ordinate to the same absolute scales. Assume now that these two signals are formed, at the transmitter, in the manner hereinbefore outlined and that the chromaticity signal is known to be accurately representative of red color intelligence at instants designated $t_R$ along the time axis, of green color intelligence at instants designated $t_G$, and of blue color intelligence at instants designated $t_B$. The practical determination of these instants at the receiver involves the utilization of the received color synchronizing signal. Since this may be done in well-known manner and is of no importance to a grasp of the essentials of my invention, no detailed discussion thereof is presented in connection with Figures 1 or 2A through 2C. Under the conditions hereinbefore assumed, the signal illustrated is representative of a purely red portion of the televised scene having constant light intensity. This may be concluded from the fact that the chromaticity representative sinewave peaks at times $t_R$ and by the fact that the amplitude OM of the monochrome signal is equal to one-third the amplitude MC of the sinewave. This is in accordance with the manner of production of the video signal at the transmitter which, as has been hereinbefore explained, consists of adding together one-third the amplitude of the three different primary color camera output signals to produce the monochrome signal, while utilizing the three separate output signals to modulate the amplitudes of three different sinewaves, in mutual 120 degree phase relationship. Note that a purely red image portion of constant light intensity will produce one sinewave of predetermined constant amplitude, represented in Figure 2A by curve 26, while the other two sinewaves will have zero amplitude so that they will contribute nothing to the total chromaticity signal, constituted by the additive combination of all three of these sinewaves. The monochrome signal component will then, as here illustrated, be equal to one-third the amplitude of this sinewave. Note that the instants $t_R$ occur at the peak of each cycle of the sinewave, while the instants $t_G$ and $t_B$ are spaced by 120 degrees in phase from instants $t_R$. Confirmation of the fact that this signal is indeed accurately representative of the coloration of the televised scene will be found in the observation that its total amplitude, comprised of the algebraic sum of the monochrome signal 25 and the chromaticity representative sinewave 26 is exactly zero at instants $t_G$ at which it is representative of the green light intensity of the televised scene and again at instants $t_B$ when it is representative of the blue light intensity of the televised scene.

If a signal of the form illustrated in Figure 2A were now utilized to control the beam intensity of a cathode ray tube such as tube 17 of Figure 1, with the zero potential level of Figure 2A corresponding to the zero beam intensity level of the cathode ray tube, then an accurate reproduction of the coloration of the televised scene would be obtained only if the scanned phosphor strips were of infinitesimally narrow width. As has been indicated, it is impractical to make these phosphor strips of infinitesimally narrow width, or even to make them very narrow compared to the space traversed by the scanning electron beam during one cycle of the chromaticity representative signal, because of the prohibitive reduction in emitted light intensity which such narrowing of the phosphor strips produces. In practice, the different colored light emissive phosphor strips will therefore have to occupy a substantial portion of the space traversed by the electron beam along its scanning path across the screen structure during one period of the chromaticity representative sinewave. In fact, to obtain most efficient utilization of the screen area, it is preferable to have the three different colored light emissive phosphor strips fill the entire space traversed by the scanning beam during each such period of the chromaticity signal, with each of the phosphor strips occupying approximately one-third of this region. Figure 2B is a greatly enlarged diagrammatic illustration of a fragment of such a screen structure, in which immediately adjacent portions of substantially equal horizontal dimensions are respectively constituted of phosphors emissive of red, green and blue light in response to electron beam impingement. Portions emissive of red light are designated by reference character R, while portions emissive of green light are designated by reference character G and portions emissive of blue light are designated by reference character B. It will be understood that this diagrammatic representation is not intended to be completely representative of the physical construction of such a screen structure, but only of the spatial relationships obtaining between the differently colored light emissive phosphor strips of which this structure may be constituted. Various particular physical structures are known in the art, their constructional details being immaterial for my purposes. For example, a screen structure having the physical configuration illustrated in Figure 2 of copending United States patent application No. 242,264, filed August 17, 1951, and assigned to the assignee of the present invention, may be used as the screen structure 23 of Figure 1.

Figure 2B has been drawn directly below Figure 2A, the red, green and blue phosphor representative portions having been placed in a particular alignment with respect to the signal shown in Figure 2A. Specifically, the red light emissive strips R have been shown as centered about the points designated $t_R$ in Figure 2A, while the green light emissive strips G are centered about the points designated $t_G$ in Figure 2A and the blue light emissive strips B are centered about the points designated $t_B$ in Figure 2A. This has been done to indicate the time-space relationship between various portions of the received video signal and portions of the screen structure upon which the video modulated electron beam is incident. The particular relationship illustrated signifies that the scanning electron beam, which is assumed to be moving from left to right across the different strips of Figure 2B, will be impingement upon the center of a red light emissive phosphor strip R at each instant $t_R$ when its intensity is determined by the peak amplitude of the chromaticity representative sinewave of Figure 2A. Similarly, the scanning electron beam will be incident upon the center of a green light emissive phosphor strip G at each instant $t_G$ when the beam intensity, as controlled by the amplitude of the video signal shown in Figure 2A, is zero. The beam will next travel to an adjoining blue light emissive phosphor strip B, remaining at zero intensity until it reaches the center of this phosphor strip B at instant $t_B$, because the video signal shown in Figure 2A has a negative excursion during this interval. Note that the beam controlled by the signal of Figure 2A has the proper intensity to produce zero light emission from the green and blue phosphor strips when it impinges at the centers of these strips. On the other hand, it has values intermediate zero and maximum intensity (which it reaches at the center of each red strip) while impingent upon portions of the green and blue phosphor strips which are nearer to the red strip which separates them than the centers of each green and blue strip. Consequently, although the received video signal is of a form which indicates that the televised scene contains no green or blue colored light, nevertheless some green and blue light will be emitted from the receiver cathode ray tube screen structure, because the scanning beam is not fully extinguished during traversal of the entire green and blue strips. Thus, while the amplitude of the received signal, at the instants at which it is representative of picture intelligence, indicates the existence of a predetermined ratio between amounts of light of the different colors in the televised scene, the amounts of light of these colors reproduced by the cathode ray tube in response to this signal will be in different ratios to each other. More specifically, the ratios of the amounts of light of the different reproduced colors will be closer to unity than the ratios of signal amplitudes representative of these colors. As has been indicated, this results in desaturation of the reproduced image, causing deep colors in the televised scene to be reproduced as pastels.

The remedial effect of my invention upon this situation will become apparent from a consideration of Figure 2C, to which reference may now be had. There is illustrated in Figure 2C a video signal representative of the same televised scene as the video signal illustrated in Figure 2A, but after the latter has been modified in accordance with my invention by means of circuits like those illustrated in Figure 1. It will be recalled that these circuits cooperate to subtract a signal proportional to the amplitude of the chromaticity sinewave from the monochrome signal. In the particular case illustrated in Figure 2C, there has been subtracted, from the monochrome signal 25 of amplitude OM shown in Figure 2A, a unidirectional signal of amplitude equal to the amplitude of the chromaticity representative sinewave 26 of both Figures 2A and 2C. The modified monochrome signal resulting from this subtraction is indicated in Figure 2C by horizontal broken line 27. Observe that this line is now located below the zero potential reference line, indicating a negative monochrome component. The chromaticity representative sinewave which is now centered about the new monochrome signal level, is seen to exceed the zero potential reference level during a much shorter portion of each cycle than in Figure 2A. As a matter of fact, concurrent inspection of Figures 2B and 2C will reveal that, if a signal of the form illustrated in Figure 2C is utilized to control the beam intensity of a beam scanning the screen structure diagrammatically illustrated in Figure 2B, then the beam will be turned on only during portions of its scan during which it is incident upon a red light emissive phosphor strip R. Whenever it is incident upon green and blue light emissive phosphor strips G and B, on the other hand, the beam will be entirely extinguished, because its driving potential is then below its zero intensity value. Consequently, this scanning beam will produce no illumination at all of either the green light emissive or the blue light emissive phosphor strips, but only of the red light emissive phosphor strips and the desired signal represented ratios between amounts of light of the different colors will be substantially reestablished. Therefore, no desaturation of the red image will occur and the fidelity with which this saturated color in the televised image is reproduced will be substantially enhanced.

While the manner in which the practice of my invention reduces desaturation of a reproduced image has been demonstrated by illustration for only one particular signal condition, it will be readily apparent that corresponding improvements will be realized in the reproduction of signals representative of different color and brightness conditions of the televised scene. Note, particularly, that in a case where the amplitude of the chromaticity representative sinewaves is small, or even zero, indicating very light pastel shades, or even a white televised scene, the amplitude of the monochrome signal will be diminished either very little, or not at all by the practice of my invention. Whenever these conditions prevail in the televised scene, however, saturation of the reproduced colors is obviously not great and minimum reduction of the monochrome signal amplitude is therefore desirable. In the illustrative case hereinbefore discussed, in which the colored light emissive screen elements occupy the entire screen area and in which the desaturation occurring in the absence of my improvement would be greatest, the optimum adjustment of the apparatus of Figure 1 is one which effects reduction of monochrome component amplitude by an amount substantially equal to the amplitude of the chromaticity component. Should the screen elements be narrower, and spaced apart, then the desaturation occurring in the absence of my improvement would be less and the amount of correction required would be correspondingly less.

Referring now once more to Figures 2A and 2C, it will be noted that the diminution of the monochrome signal 25 of Figure 2A in accordance with my invention causes not only a reduction in the duration of the time intervals during which the chromaticity signal 26 exceeds the zero potential level, i.e. the zero beam intensity level of the cathode ray tube, but also a decrease in the absolute amount by which this chromaticity signal exceeds this zero potential level. Consequently, the maximum intensity of the electron beam, which is determined by the maximum amplitude of the applied intensity control signal, will also be reduced and, while the saturation of the reproduced image will be substantially improved, the total light emission from the screen structure will be reduced. Whenever the phosphor materials used in the construction of the screen structure are sufficiently efficient light emitters so that satisfactory levels of illumination can be produced in spite of this reduction in the beam intensity, no additional modification of the received signal need be carried out. In such a case, the amplifier 13 of Figure 1 could either be omitted altogether, or, if provided, it would be adjusted to have unity gain so that the amplitude of the chromaticity signal supplied to beam intensity control grid 16 of cathode ray tube 17 would be substantially the same as when it is derived from video signal source 10.

If, on the other hand, the light emission efficiency of the screen phosphors is not sufficiently high to provide a satisfactory level of illumination when the monochrome signal amplitude is reduced in accordance with my invention, then it may be necessary to additionally increase the amplitude of the chromaticity signal so as to restore its maximum excursion, above the zero potential level, to a value approximating the value which it had before the subtraction from the monochrome signal was carried out. When this becomes necessary, the required additional modification may be carried out very simply by adjusting the gain of amplifier 13 of Figure 1 to a suitable value greater than unity. The particular value of amplifier gain required for this purpose will, of course, depend upon the ratio between the amplitude of the received chromaticity signal and the unidirectional low frequency components derived therefrom for subtraction from the received monochrome signal. For each particular adjustment of the elements determining this ratio, it will then be a simple matter for any one skilled in the art to determine the optimum adjustment of the gain of amplifier 13. In any case, an arbitrary setting of the amplifier gain to a value of two has been shown to produce very satisfactory images in actual practice.

It has been previously indicated that the transmission to rectifier 14 of components of the synchronizing signals located in the 3 to 4 megacycle chromaticity frequency range does not disturb the operation of the system in accordance with my invention. The reason for this is found in the fact that only the color synchronizing signals have any substantial amplitude components within this range. However, these synchronizing signals have very low duty cycles, occurring, in present practice, only for approximately four percent of the time. Consequently, even though these signals are supplied to rectifier 14, which produces a unidirectional output signal in response thereto, this signal will, after passage through low-pass filter 15, have no appreciable effect in determining the final amplitude of the low frequency monochrome signal supplied to the cathode ray tube. Other synchronizing signals, such as, for example, the horizontal line synchronizing pulses, the field, and the frame synchronizing pulses, have no components of appreciable magnitude in this 3 to 4 megacycle range. Consequently, their presence will not materially affect the amplitude of the monochrome signal.

Figures 3, 4:
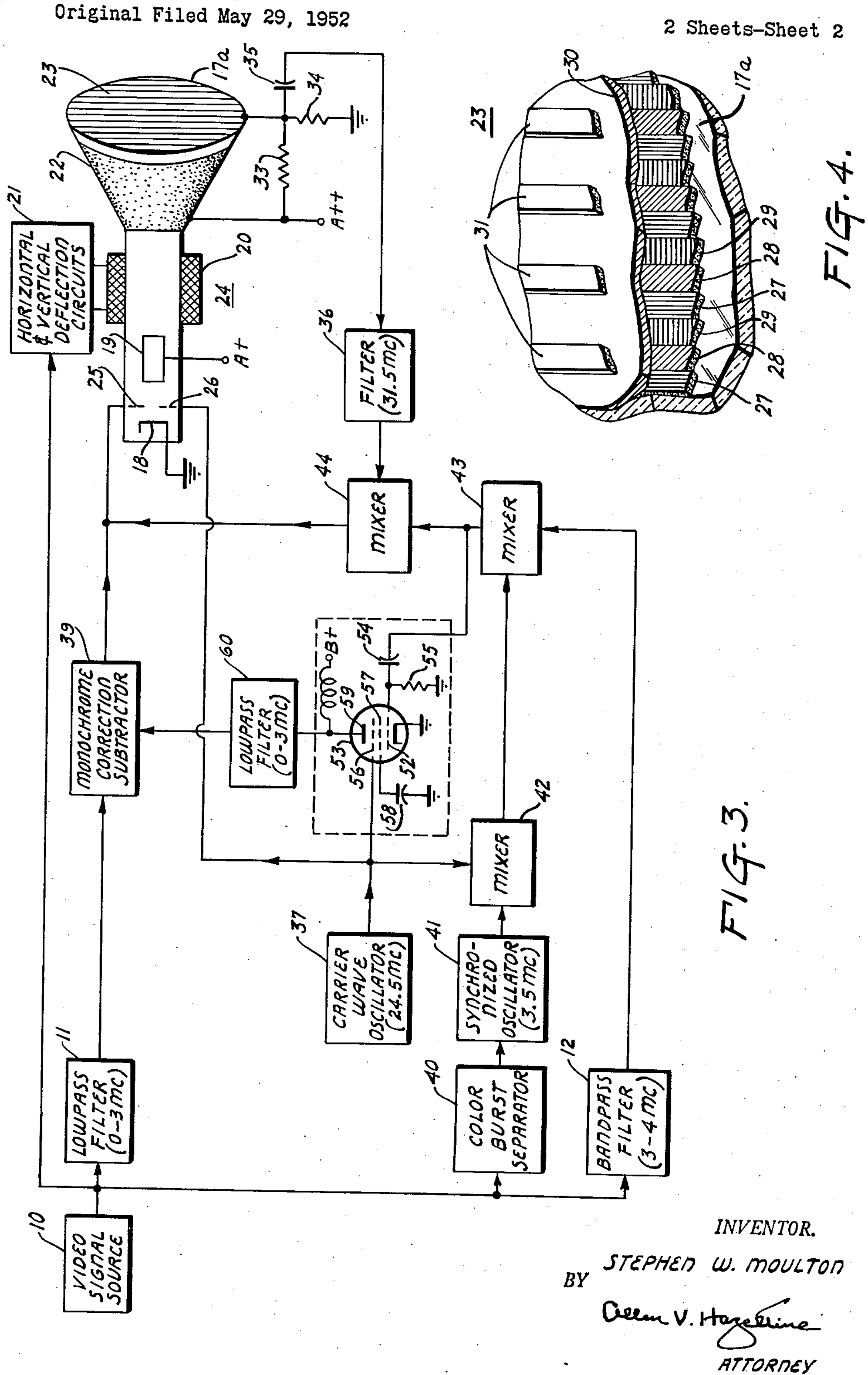
Figure 3 shows another embodiment of my invention in a color television receiver.
Figure 4 is an enlarged fragmentary view of a cathode ray tube screen for use in the television receiver of Figure 3.

In the system illustrated in Figure 1, the chromaticity representative component of the composite television signal is seen to be applied to the beam intensity control grid of the cathode ray tube, after reduction to the video frequency range, substantially in the form in which it is received, subject only to the amplitude changes introduced by amplifier 13 in accordance with the requirements of my invention. However, it is also apparent from the foregoing discussion that the successful operation of this system in accordance with my invention is dependent upon the achievement of beam impingement on colored light emissive phosphor strips of the cathode ray tube structure at those intervals at which the chromaticity component, and therefore also the beam intensity, are both representative of intelligence regarding that particular color. To achieve this registry, with the system of Figure 1, reliance is placed principally on the use of horizontal deflection circuits which are capable of producing a truly linear horizontal deflection of the electron beam and on the accurate maintenance of predetermined spacings between adjacent phosphor strips emissive of light of different colors. While it is possible to meet both of these requirements in the present state of the art, the necessary equipment is complicated and expensive. Therefore, it is considered preferable, from a practical standpoint, to allow greater latitude in the construction of the horizontal deflection circuits and of the screen structure, and to compensate by other means for errors in beam impingement arising from these causes. A particularly successful technique which has been evolved to compensate for registry errors from these causes is known as the "indexing" technique and is generally characterized by the derivation of indications, from the cathode ray tube proper, of beam impingement upon certain predetermined portions of its screen structure and by the subsequent utilization of these indications to control the rate of application of the chromaticity signal to the beam intensity control grid electrode of the same cathode ray tube. The preferred manner of utilizing this indexing technique to insure proper beam impingement registry in a color television receiver embodying my invention is illustrated in Figure 3 of the drawings, to which more particular reference may now be had.

This system comprises a video signal source 10 whose construction and composition may be identical to that of the similarly designated video signal source of Figure 1. Consequently, there will be available at the output of video signal source 10 of Figure 3, the same composite video signal as at the output of video signal source 10 of Figure 1 which comprises a monochrome component in the 0 to 3 megacycle frequency range, a chromaticity component in the 3 to 4 megacycle range and conventional picture and color synchronizing signals interspersed therewith. There is further provided a cathode ray tube 24 which is, in most respects, identical to the cathode ray tube 17 of Figure 1. It may comprise, as did the latter, a cathode 18, a first anode 19 connected to a conventional source of first anode potential A+, and a second anode 22 connected to its conventional source of second anode potential A++. Further, the cathode ray tube 24 may be provided with conventional horizontal and vertical deflection coils 20, supplied with suitable deflection signals from conventional horizontal and vertical deflection circuits 21, which latter derive their synchronizing impulses in known manner from the output of video signal source 10. However, for reasons which will presently be explained, the cathode ray tube 24 of Figure 3 is preferably provided with two separate beam intensity control grids 25 and 26 constructed so as to cause the formation of two closely spaced, but separate electron beams, with separately controllable intensities. The particular construction of these control grids is immaterial for the purposes of my invention, provided they function in the manner hereinbefore outlined. Particular arrangements of grids which are suitable for use as grids 25 and 26 are illustrated in Figures 3 and 4 of the aforementioned copending United States patent application No. 242,264.

The cathode ray tube 24 is further provided with a screen structure 23 which, as has been indicated in connection with the discussion of Figure 1, may have the physical configuration illustrated in Figure 2 of copending United States patent application No. 242,264. For convenience of reference, a perspective, fragmentary view of the screen structure shown in the aforementioned copending application has been included here as Figure 4 of the drawings, to which more particular reference may now be had. As shown therein, the screen structure 23 is formed directly on the face plate 17$a$ of the cathode ray tube 24 of Figure 3. However, it should be well understood that the structure 23 may be formed on a suitable light transparent base which is independent of the face plate 17$a$ and may be spaced therefrom. In the arrangement shown, the face plate 17$a$, which in practice consists of glass having preferably substantially uniform transmission characteristics for the various colors of the visible spectrum, is provided with a plurality of groups of elongated parallelly arranged strips 27, 28 and 29, of phosphor material which, upon impingement by electrons, fluoresce to produce light of three different primary colors. For example, the strips 27 may consist of phosphor which, upon electron impingement, produces red light, the strips 28 may consist of phosphor which produces green light, and the strips 29 may consist of phosphor which produces blue light. Each of the groups of strips may be termed a color triplet and, as will be noted, the sequence of the strips is repeated in consecutive order over the area of the structure 23. Suitable materials constituting the phosphor strips 27, 28 and 29 are well known to those skilled in the art, as well as the methods for applying them to the face plate 17$a$, and further details concerning the same are believed to be unnecessary.

In the arrangement shown, the indexing indications are produced by utilizing indexing strips of a given secondary electron emission ratio differing from the secondary-electron emission ratio of the remainder of the beam intercepting structure, and for this purpose the structure 23 further comprises a thin, electron permeable, conducting layer 30 of low secondary electron emissivity. The layer 30, preferably made of aluminum, is arranged on the phosphor strips 27, 28 and 29 and preferably further constitutes a mirror for reflecting light generated at the phosphor strips. It should be well understood that other metals capable of forming a coating in a manner similar to aluminum, and having a secondary emission ratio detectably different from that of the material of the indexing strips, may also be used. Such other metals may be, for example, magnesium or beryllium.

Arranged on the coating 30 and aligned with consecutive strips 28 are indexing strips 31 consisting of a material having a secondary-emission ratio detectably different from that of the material of coating 30. The strips 31 may be of gold or other high atomic number metals such as platinum or tungsten, or of an oxide such as magnesium oxide.

The entire screen structure 23 of Figures 3 and 4 is maintained at a suitable positive potential by way of a resistor 33 connecting this screen structure to the source of second anode potential A++. The screen structure is also connected to an output resistor 34 across which variations in current flow to the screen structure, produced in a manner hereinafter explained, will develop a varying potential. The variations in this potential are then transmitted through capacitor 35 to a filter 36 whose construction and operation will be explained in detail hereinafter.

As has been explained, the electron beams of this cathode ray tube are repetitively deflected across its screen structure in a direction transverse to the longitudinal dimension of the aforedescribed phosphor strips 27, 28 and 29 and to the secondary electron emissive strips 31. Whenever these beams, during this traversal of the screen structure, traverse a strip 31, the secondary electron emission from the screen structure will be substantially greater than when the same beams traverse a portion of the screen structure intermediate strips 31. Consequently, beam traversal of a strip 31 will be indicated by a change in the net screen current drawn by the cathode ray tube. This change in screen current will, in turn, produce a change in the potential developed across resistor 34 and this change of potential will be transmitted by capacitor 35 to filter 36 as hereinbefore explained. Since strips 31 are in geometrical alignment with green light emissive strips 28, this change in screen output potential, occurring at intervals at which the beams are impingent upon strips 31 of the screen structure, then provides an electrical indication of beam impingement upon the green light emissive phosphor strips 28. It will be seen that these voltage variations occur at a fundamental frequency equal to the rate at which the electron beams traverse successive green light emissive phosphor strips. Departures in the rate of beam traversal of such consecutive green light emissive phosphor strips from its nominal desired value due either to non-linearity of the sweep circuit or to non-uniform spacing of adjacent phosphor strips, will then be reflected by frequency and phase variations of these fundamental components of the screen output signal or, as it is frequently called, the indexing signal.

In the embodiment of Figure 3, a composite television signal, comprising a monochrome component and a chromaticity component both derived from source 10 in a manner hereinafter explained are applied to beam intensity control grid 25. Because the chromaticity component will be shown to vary at a nominal rate equal to the rate of beam traversal of successive phosphor strips emissive of light of a particular color, the intensity of the beam controlled by grid 25 will also be modulated at this rate. Consequently, there will be produced across screen output resistor 34, variations in potential at or near the same frequency as the variations produced by beam impingement upon successive indexing strips. These variations would then be indistinguishable from the desired indexing indications and would produce contamination thereof which would render them useless. To avoid this contamination of indexing indications with video signal intelligence, there is provided, in a receiver embodying my invention, a carrier wave oscillator 37, conventionally constructed to produce a continuous signal of a predetermined high frequency, such as 24.5 megacycles, for example, lying well above the range of all video components supplied to the cathode ray tube beam intensity control grid 25. According to present standards, the number of phosphor strips constituting the screen surface and the horizontal scanning rate are so chosen as to require the application of a chromaticity component of 7 megacycle nominal frequency to the beam intensity control grid 25. As this 7 megacycle component, subject only to variations in accordance with signal intelligence over a 1 megacycle range centered at 7 megacycles, is the highest frequency component of the signal supplied to this control grid, the aforementioned 24.5 megacycle frequency will be sufficiently high for present purposes. The signal produced by carrier wave oscilltaor 37 is supplied directly to beam intensity control grid 26 where it produces variations in beam intensity and of screen current at a 24.5 megacycle rate. As the beam controlled by grid 26 traverses consecutive indexing strips 31 of the screen structure, the amplitude of the 24.5 megacycle screen current variations will vary at the 7 megacycle rate of traversal of these consecutive indexing strips. Consequently, there will appear across resistor 34 a signal of 24.5 megacycle nominal frequency, amplitude modulated at the aforementioned 7 megacycle rate. Filter 36 is constructed so as to derive the upper modulation sideband of the signal produced across screen resistor 34, this being a signal of 31.5 megacycle nominal frequency subject to phase variations depending upon the linearity of the beam sweep and the accuracy of spacing of the phosphor strips. Note that beam intensity modulation by means of the video signal will produce no components at this frequency and will therefore not contaminate the indexing signal.

Although it is feasible to apply the video signal and the carrier wave signal to one and the same beam intensity control grid, the aforedescribed construction with separately controlled beams is preferred, because any tendency of a single grid and cathode structure to produce undesired beats between the applied signals is inherently eliminated.

Considering now the manner of application of video signals to the beam intensity control grid 25 of the cathode ray tube, it will be noted, first of all, that the monochrome signal components are separated from the other components of the composite video signal produced by source 10 by means of a low-pass filter 11 similar to the similarly designated low-pass filter 11 in the embodiment of Figure 1. These separated monochrome components are then supplied to the beam intensity control grid 25 of the cathode ray tube, subject only to modification in monochrome correction subtractor 39 in a manner hereinafter explained. The chromaticity component of the composite signal produced by video signal source 10 is likewise separated from the other components of this signal by means of bandpass filter 12 of similar construction to the similarly designated bandpass filter of the system of Figure 1. There will, therefore, be available at the output of bandpass filter 12, the chromaticity component of 3.5 megacycle nominal frequency, amplitude and phase modulated in accordance with chromaticity intelligence.

The aforementioned color synchronizing signal consists, in accordance with present practice, of a small number of cycles of a signal at the nominal frequency of the chromaticity component and bearing predetermined constant phase relationship to each of the three color representative sinewaves of which this chromaticity component is constituted at the transmitter, these bursts being superposed upon the horizontal blanking pulses, together with the horizontal line synchronizing pulses commonly provided in black-and-white televisions as well as in color television. The color synchronizing signal hereinbefore described is separated by means of a color burst separator 40 which may comprise an amplitude selective device, such as a triode biased so far negatively as to be driven into conduction only by the horizontal line blanking pulses to permit transmission only of the horizontal line synchronizing pulses and of the aforementioned color synchronizing bursts. These latter are then separated from the horizontal line synchronizing pulses by a narrow bandpass filter transmissive only of signals of the nominal chromaticity signal frequency.

The color synchronizing bursts thus separated are supplied to a synchronized oscillator 41 which is conventionally constructed to produce a continuous output signal locked in frequency and phase with the color synchronizing bursts intermittently supplied thereto. There will then be available at the output of oscillator 41, a 3.5 megacycle signal bearing the same reference phase relationship to the chromaticity signal as did the color synchronizing bursts. This signal is supplied to one input circuit of a conventional mixer 42, the output signal from carrier wave oscillator 37 being supplied to the second input circuit of this mixer 42. The difference frequency heterodyne component, at 21 megacycles, produced by this mixer is preferably derived therefrom as an output signal. This 21 megacycle signal will also bear the aforementioned reference phase relationship to the chromaticity component.

This 21 megacycle output signal of mixer 42, and the received chromaticity component separated by bandpass filter 12 are then respectively supplied to the two input circuits of a second conventional mixer 43. The sum frequency heterodyne component, at 24.5 megacycle nominal frequency, produced by this mixer 43 is then preferably derived therefrom. This signal derived from mixer 43 will now bear the phase and amplitude modulation of the received chromaticity component relative to the signal of reference phase represented by the 21 megacycle signal derived from mixer 42. This 24.5 megacycle output signal from mixer 43 is now supplied to one input circuit of a third mixer 44, the output signal from filter 36 being supplied to the second input circuit of this mixer 44. The difference frequency heterodyne component produced by mixer 44, at 7 megacycle nominal frequency, is derived from this mixer and supplied directly to beam intensity control grid 25 of the cathode ray tube. This 7 megacycle signal will now bear not only the phase and amplitude modulation of the received chromaticity component but will also bear the phase modulation of the indexing signal derived from filter 36. Thus the signal produced by mixer 44 will not only be representative of intelligence respecting the three different primary colors at three intervals during each cycle, but the phase of this signal and with it the particular times at which these color intelligence representative intervals occur, will adjust itself to the actual requirements of beam impingement registry, taking into account both variations in sweep linearity and inaccuracies in phosphor strip spacing.

If the monochrome signal derived from source 10 is constituted of equal fractions of the individual red, green and blue camera output signals, as hereinbefore described, then it is suitable for application to the cathode ray tube grid 25 subject only to modification in accordance with the invention. In that case, the amplitude of the chromaticity component, at any stage of its progress subsequent to separation by filter 12, may be detected just as was done in the system of Figure 1 and a fraction of those components of the detected signal which lie in the monochrome frequency range may be subtracted from the monochrome signal output of filter 11 by means of monochrome correction subtractor 39, which may be of any conventional construction suitable for the subtraction of one signal from another. For example this subtractor may be of any one of the several forms described in Section 18.3, beginning on page 640 of "Waveform," which is volume 19 of the Massachusetts Institute of Technology Radiation Laboratories Series, published 1949, by McGraw-Hill Book Co. Inc., New York. The value of the fraction which must be so derived and subtracted for best results may be determined for any particular case in accordance with the criteria set forth in the discussion of Figures 1 and 2.

However, in accordance with certain proposed standards of color television transmission, the monochrome signal from source 10 may not be of aforedescribed form but may instead be so constituted as to be representative of the luminosity of successively scanned elements of the televised scene, while being entirely independent of their chromaticity. The use of such a monochrome signal is thought to be preferable because it improves the fidelity with which the televised scene is reproduced by a conventional black-and-white television receiver. It may be shown, by the application of well-known principles of colorimetry that the application of such a monochrome signal to a color television cathode ray tube such as tube 24, having substantially equally spaced phosphor strips, will cause improper rendition of the televised colors. It has been found that the subtraction, from this unsuitable monochrome component, of a signal bearing a predetermined proportionality to both the amplitude and phase modulation of the chromaticity component, will result in the reconstitution of a suitable monochrome component. Assuming now that it is the aforedescribed unsuitable monochrome component representative of luminosity only, which is derived from source 10, then a convenient way of effecting this correction is by the heterodyne demodulation of the amplitude and phase modulation representative of chromaticity, which is borne by the output signal from mixer 43. For this purpose, this signal is supplied, not only to mixer 44, but also to a first control grid electrode 52 of a pentode vacuum tube 53, by way of D.-C. blocking capacitor 54 and grid bias resistor 55. To the second control grid electrode 56 of this same pentode 53, there is supplied the output signal from carrier wave oscillator 37. It will be recalled that this is also a 24.5 megacycle signal, but that it has substantially constant amplitude and phase. The screen grid electrode 57 of pentode 53 is conventionally grounded through a capacitor 58 and its anode 59 is connected to a suitable source of B+ potential as well as to an input circuit of monochrome correction subtractor 39 through low-pass filter 60. The pentode will then operate to produce heterodyne frequency output components at the sum and difference frequencies of the two alternating input signals. Since one of these signals is always at 24.5 megacycles, while the other is nominally at 24.5 megacycles, but subject to variations within a one megacycle band centered about this nominal frequency due to chromaticity intelligence modulation, the difference frequency heterodyne component produced by this pentode will be proportional to both the amplitude and the phase modulation of the chromaticity component of the composite signal. This difference frequency component is in the 0 to 0.5 megacycle range and is therefore well within the range of the monochrome component, extending from 0 to 3 megacycles. This difference frequency signal is then separated from othere heterodyne components by filter 60 which is conventionally constructed to be transmissive only of signals in the monochrome, or 0 to 3 megacycle frequency range, and is applied to monochrome correction subtractor 39, thereby to effect the desired correction of the monochrome signal which renders it suitable for application to a cathode ray tube with substantially equally spaced phosphor strips.

Once this additional apparatus has been provided, for the reasons hereinbefore outlined, its existence may be utilized to advantage in practicing my invention. To this end, the circuit associated with pentode 53 is so constructed that it will not only effect heterodyne detection of the amplitude and phase modulation of the chromaticity component but so that it will, in addition, effect simple amplitude detection of this chromaticity component. For this purpose, the grid-to-cathode circuit of the tube is not provided with a resistor by-passed for alternating currents, as it would normally be. Consequently, a bias will be developed at the first grid which is proportional only to the amplitude of the chromaticity component and this bias will, in turn, control the anode potential so that the latter will also be proportional to this amplitude. Thus the output signal of pentode 53 may be utilized to modify the monochrome component in accordance with the invention, as well. In that case, the separate chromaticity amplitude detector, hereinbefore discussed in its application to the system of Figure 3 will, of course, be superfluous.

It will be understood that, while the signal modification in accordance with my invention has been shown as being carried out in the receiver video stage immediately preceding the cathode ray tube, the invention is not limited in this respect. Not only may this signal modification be carried out at other suitable stages of the receiver but it may even be carried out at the transmitter, provided all receivers supplied with the modified transmitted signal are known to require substantially the same modification.

It is well known that color television systems of the simultaneous type with which I am concerned may utilize transmitted monochrome and chromaticity signals which are not formed in exactly the manner hereinbefore outlined, namely with equally time-spaced intervals representative of red, green and blue color intelligence. When the make-up of the signal is different in this respect, then the spacing and/or the order of disposition of the colored light emissive screen elements may have to be changed, but the practice of my invention will continue to yield improvements in reproduced color saturation just as in the illustrated case.

From the foregoing, it will be apparent that my invention is susceptible of a variety of alternative embodiments apparent to those skilled in the art. Therefore, I desire its scope to be limited only by the appended claims.

I claim:

1. In combination: a source of a first unidirectional signal; a source of an alternating signal; means supplied with said alternating signal and responsive thereto to produce a second unidirectional signal whose amplitude is proportional to the amplitude of said alternating signal; means supplied with said first and second unidirectional signals and operative to produce a third unidirectional signal whose amplitude is proportional to the difference between the amplitudes of said first and second unidirectional signals; and means for additively combining said third unidirectional signal and a signal proportional to said alternating signal for application to a signal utilization device.

2. In combination: a source of a first unidirectional signal in a predetermined frequency band; a source of an alternating signal in a different frequency band; means supplied with said alternating signal and responsive thereto to produce a second unidirectional signal whose amplitude is proportional to the amplitude of said alternating signal; means supplied with said second unidirectional signal and operative to derive therefrom components in the frequency band of said first unidirectional signal; means supplied with said derived unidirectional components and with said first unidirectional signal and operative to produce a third unidirectional signal whose amplitude is proportional to the difference between the amplitudes of said supplied unidirectional components and said first unidirectional signal; and means for additively combining said third unidirectional signal and a signal proportional to said alternating signal for application to a signal utilization device.

3. In combination: a source of a first unidirectional signal in a predetermined frequency band; a source of an alternating signal in a different frequency band; means supplied with said alternating signal and responsive thereto to produce a second unidirectional signal whose amplitude is a proper fraction of said alternating signal; means supplied with said second unidirectional signal and operative to derive therefrom components in the frequency band of said first unidirectional signal; means supplied with said derived unidirectional components and with said first unidirectional signal and operative to produce a third unidirectional signal whose amplitude is proportional to the difference between the amplitudes of said supplied unidirectional components and of said first unidirectional signal; and means for additively combining said third unidirectional signal and a signal proportional to said alternating signal for application to a signal utilization device.

4. In combination: a source of a first unidirectional signal in a predetermined frequency band; a source of an alternating signal in a different frequency band; a rectifier supplied with said alternating signal and responsive thereto to produce a second unidirectional signal whose amplitude is proportional to the amplitude of said alternating signal; a filter supplied with said second unidirectional signal and operative to derive therefrom components in the frequency band of said first unidirectional signal; means supplied with said derived unidirectional components and with said first unidirectional signal from said source and operative to produce a third unidirectional signal whose amplitude is proportional to the difference between the amplitudes of said supplied unidirectional components and signal; and means for additively combining said third unidirectional signal and a signal proportional to said alternating signal for application to a signal utilization device.

5. In combination: a source of a first unidirectional signal in a predetermined frequency band; a source of a first alternating signal in a different frequency band; means supplied with said first alternating signal and responsive thereto to produce a second unidirectional signal whose amplitude is proportional to the amplitude of said first alternating signal; means supplied with said second unidirectional signal and operative to derive therefrom components in the frequency band of said first unidirectional signal; means supplied with said derived unidirectional components and with said first unidirectional signal and operative to produce a third unidirectional signal whose amplitude is proportional to the difference between the amplitude of said supplied unidirectional components and signal; means supplied with said first alternating signal and operative to produce a second alternating signal of frequency proportional to the frequency of said first alternating signal and of substantially twice the amplitude of said first alternating signal; and means for additively combining said third unidirectional signal and said second alternating signal for application to a signal utilization device.

6. In a color television system: a source of a first signal representative of monochromatic intelligence and lying in a predetermined frequency range; a source of a second signal representative of chromaticity intelligence and lying in a different frequency range; means responsive to an applied unidirectional signal and to an applied alternating signal to produce an image having monochromatic and chromaticity components; means supplied with said first and second signals and operative to reduce the amplitude of said first signal by an amount proportional to the amplitude of said second signal; and means supplied with said signal of reduced amplitude and with said second signal and responsive thereto to produce said unidirectional and alternating signals respectively.

7. In a color television system: a source of a first signal representative of monochromatic intelligence and lying in a predetermined frequency range; a source of a second signal representative of chromaticity intelligence and lying in a different frequency range; means responsive to an applied unidirectional signal and to an applied alternating signal to produce an image having monochromatic and chromaticity components respectively determined by the amplitudes of said unidirectional signal and of said alternating signal; means supplied with said first and second signals and operative to produce a signal of amplitude proportional to the amplitude of said second signal and lying in the frequency range of said first signal; means supplied with said produced signal and with said signal; means supplied with said produced signal and with said first signal and operative to reduce the amplitude of said first signal by an amount equal to the amplitude of said produced signal; and means supplied with said signal of reduced amplitude and with said second signal and responsive thereto to produce said unidirectional and alternating signals with respective amplitudes proportional to the amplitudes of said signal of reduced amplitude and of said second signal.

8. In a color television system: a source of a first unidirectional signal; a source of a first alternating signal, the combined amplitudes of said unidirectional and alternating signals being representative of the amounts of light of different component colors in a televised image at time-spaced, periodically recurrent intervals of relatively short duration; an image reproducing device responsive to an applied unidirectional signal and to an applied alternating signal to produce light of substantially said different component colors at intervals of relatively long duration and with intensity determined by the amplitude of said applied signal at said last-named intervals; means supplied with said first unidirectional signal and with a signal proportional to said first alternating signal and operative to reduce the amplitude of said first unidirectional signal by an amount proportional to the amplitude of said supplied signal proportional to said first alternating signal; and means for applying to said device said first unidirectional signal of reduced amplitude and an alternating signal proportional to said first alternating signal.

9. In a color television system: a source of a signal comprising a unidirectional component and an alternating component, the total amplitude of said signal being representative of the amounts of light of different component colors in a televised image at time-spaced, periodically recurrent intervals of relatively short duration; an image reproducing device responsive to an applied signal comprising unidirectional and alternating components to produce light of substantially said different component colors at intervals of relatively long duration; means supplied with said unidirectional component from said source and with a signal proportional to said alternating component from said source and operative to reduce the amplitude of said unidirectional component by an amount proportional to the amplitude of said supplied signal proportional to said alternating component; and means for applying to said device said unidirectional component of reduced amplitude and an alternating signal component proportional to said alternating component from said source.

10. In a color television system: a source of a signal comprising a unidirectional component and an alternating component, the total amplitude of said signal being representative of the amounts of light of different component colors in a televised image at time-spaced, periodically recurrent intervals of relatively short duration; a cathode ray tube comprising a source of an electron beam, a screen structure having different portions responsive to electron beam traversal to produce light of said different colors respectively, and means for deflecting said beam to cause it to traverse said different screen portions at independently time-spaced intervals of relatively long duration; means supplied with said unidirectional component from said source and with a signal proportional to said alternating component from said source and operative to reduce the amplitude of said unidirectional component by an amount proportional to the amplitude of said supplied signal proportional to said alternating component; and means supplied with said unidirectional component of reduced amplitude and with an alternating signal component proportional to said alternating component from said source and operative to control the intensity of said cathode ray tube beam in accordance with the total amplitude of said supplied signals.

11. In a color television system: a source of a signal comprising a unidirectional component and an alternating component, the total amplitude of said signal being representative of the amounts of light of different component colors in a televised image at time-spaced, periodically recurrent intervals of relatively short duration; an image reproducing device responsive to an applied signal comprising unidirectional and alternating components to produce light of substantially said different component colors at time-spaced intervals of relatively long duration; means for deriving from said alternating component from said source an alternating signal representative of said different component colors at said intervals of relatively long duration; means supplied with said unidirectional component from said source and with a signal proportional to said alternating component from said source and operative to reduce the amplitude of said unidirectional component by an amount proportional to the amplitude of said supplied signal proportional to said alternating component; and means for applying to said image reproducing device said unidirectional component of reduced amplitude and said derived alternating signal.

12. In a color television system: a source of a signal comprising a unidirectional component and an alternating component, the total amplitude of said signal being representative of the amounts of light of different component colors in a televised image at time-spaced, periodically recurrent intervals of relatively short duration; an image reproducing device responsive to an applied signal comprising unidirectional and alternating components to produce light of substantially said different colors at intervals respectively including said time-spaced intervals but of relatively long duration; means supplied with said signal from said source and operative to reduce the amplitude of said unidirectional component by an amount proportional to the amplitude of said alternating component; and means for applying said unidirectional component of reduced amplitude and an alternating signal component proportional to said alternating component from said source to said image reproducing device.

13. In a color television system: a source of a signal comprising a unidirectional component and an alternating component, the total amplitude of said signal being representative of the amounts of different component colors in a televised image at time-spaced, periodically recurrent intervals of relatively short duration, an image reproducing device responsive to an applied signal comprising unidirectional and alternating components to produce light of substantially said different component colors at independently time-spaced intervals of relatively long duration; means supplied with said unidirectional component from said source and with a signal proportional to said alternating component from said source and operative to reduce the amplitude of said unidirectional component by an amount proportional to the amplitude of said supplied signal proportional to said alternating component; means for producing a signal indicative of the occurrence of said independently time-spaced intervals; means for utilizing said last-named signal to modify the periodicity of said color representative intervals in said alternating signal component from said source so as to make their occurrence coincide with the occurrence of said independently time-spaced intervals; and means for applying to said device said unidirectional component of reduced amplitude and said modified alternating component.

14. In a color television system: a source of a signal comprising a unidirectional component and an alternating component, the total amplitude of said signal being representative of the amounts of light of different component colors in a televised image at time-spaced, periodically recurrent intervals of relatively short duration; means supplied with said unidirectional component from said source and with a signal proportional to said alternating component from said source and operative to reduce the amplitude of said unidirectional component by an amount proportional to the amplitude of said supplied signal proportional to said alternating component; a cathode ray tube comprising a source of an electron beam, a screen structure having different portions responsive to electron beam traversal to produce light of said different colors respectively, and means for deflecting said beam to cause it to traverse said different screen portions at independently time-spaced intervals of relatively long duration; means for deriving from said cathode ray tube a signal indicative of the occurrence of said independently time-spaced intervals; means supplied with said cathode ray tube derived signal and with said alternating component from said source and operative to produce an alternating signal whose amplitude at said independently time-spaced intervals is proportional to the amplitude of said alternating component from said source at said periodically recurrent intervals; and means supplied with said unidirectional component of reduced amplitude and with said produced alternating signal and operative to control the intensity of said cathode ray tube beam in proportion to the total amplitude of said supplied signals.

15. In a color television system; a source of a first unidirectional signal representative of monochromatic intelligence; a source of an alternating signal of predetermined nominal frequency subject to phase and amplitude variations representative of chromaticity intelligence; means supplied with said alternating signal and responsive thereto to produce a second unidirectional signal having a first component whose amplitude varies in response to said chromaticity representative phase and amplitude variations and having a second component whose amplitude is proportional to the amplitude of said alternating signal; means supplied with said produced signal and said first unidirectional signal and operative to additively combine said signals so as to reduce the amplitude of said first unidirectional signal by an amount equal to the amplitude of said second component; and means for additively combining said unidirectional signal of reduced amplitude and a signal proportional to said alternating signal for application to an image reproducing device.

16. In a color television system: a source of a unidirectional signal representative of monochromatic intelligence; a source of a first alternating signal of predetermined nominal frequency subject to phase and amplitude variations representative of chromaticity intelligence; a source of a second alternating signal of said nominal frequency and of reference phase and amplitude for said first alternating signal; heterodyning means supplied with both said alternating signals and responsive thereto to produce heterodyne components of said supplied signals; means responsive to the amplitude of said chromaticity representative alternating signal to control the amplitude with which said heterodyne components are produced; means for selectively deriving only difference frequency heterodyne components from said heterodyning means; means supplied with said derived heterodyne components and said first unidirectional signal and operative to subtract said derived components from said unidirectional signal; and means for additively combining the signal produced by said subtracting means and a signal proportional to said first alternating signal for application to an image reproducing device.

17. In a color television system: a source of a unidirectional signal having components in a predetermined frequency range and representative of monochromatic intelligence; a source of a first alternating signal of predetermined nominal frequency subject to phase and amplitude variations representative of chromaticity intelligence; a source of a second alternating signal of said nominal frequency and of reference phase and amplitude for said first alternating signal; a vacuum tube having a plurality of electrodes, each of which is responsive to an applied signal to control the anode current of said tube; means for applying said first alternating signal to one of said electrodes; means for applying said second alternating signal to another one of said electrodes; means connected to said one electrode and cooperating with said electrode to produce at said electrode a unidirectional control potential of amplitude proportional to the amplitude of said first alternating signal; means for selectively deriving from the anode current of said vacuum tube only components in said predetermined frequency range; means supplied with said derived components and said first unidirectional signal and responsive thereto to subtract said derived components from said unidirectional signal; and means for additively combining the signal produced by said subtracting means and a signal proportional to said first alternating signal for application to an image reproducing device.

18. A signal-modifying system for a color-television receiver including a color image-reproducing device having a non-linear signal-translating characteristic tending to cause the luminance of the image reproduced by the device to differ from the luminance represented by the luminance signal applied thereto comprising: means including a first circuit for supplying a first signal primarily representative of the luminance of a color image and including a second circuit for supplying a second signal having modulation components primarily representative of the chromaticity of said color image; means comprising a non-linear signal-modifying apparatus effectively responsive to at least said modulation components of said second signal for developing therefrom a correction signal whose amplitude varies as a function of the amplitude of said modulation components but not of their phase; and means comprising a signal-translating system responsive to said first, second and correction signals for applying said last-mentioned signals to the device.

19. In a color television system: a source of a first unidirectional signal representative of monochromatic intelligence; a source of an alternating signal subject to phase and amplitude variations representative of chromaticity intelligence; an amplifier type vacuum tube having a control grid electrode supplied with said alternating signal; means for biasing said vacuum tube to cause it at least to detect said supplied signal and produce a unidirectional signal representative of the amplitude of said supplied signal; means supplied with the detected signal produced by said tube and with said first unidirectional signal and responsive thereto to reduce the amplitude of said last-mentioned signal by an amount proportional to the amplitude of said detected signal; and means for additively combining said unidirectional signal of reduced amplitude and a signal proportional to said alternating signal for application to a signal utilization device.

No references cited.